Figure 1:
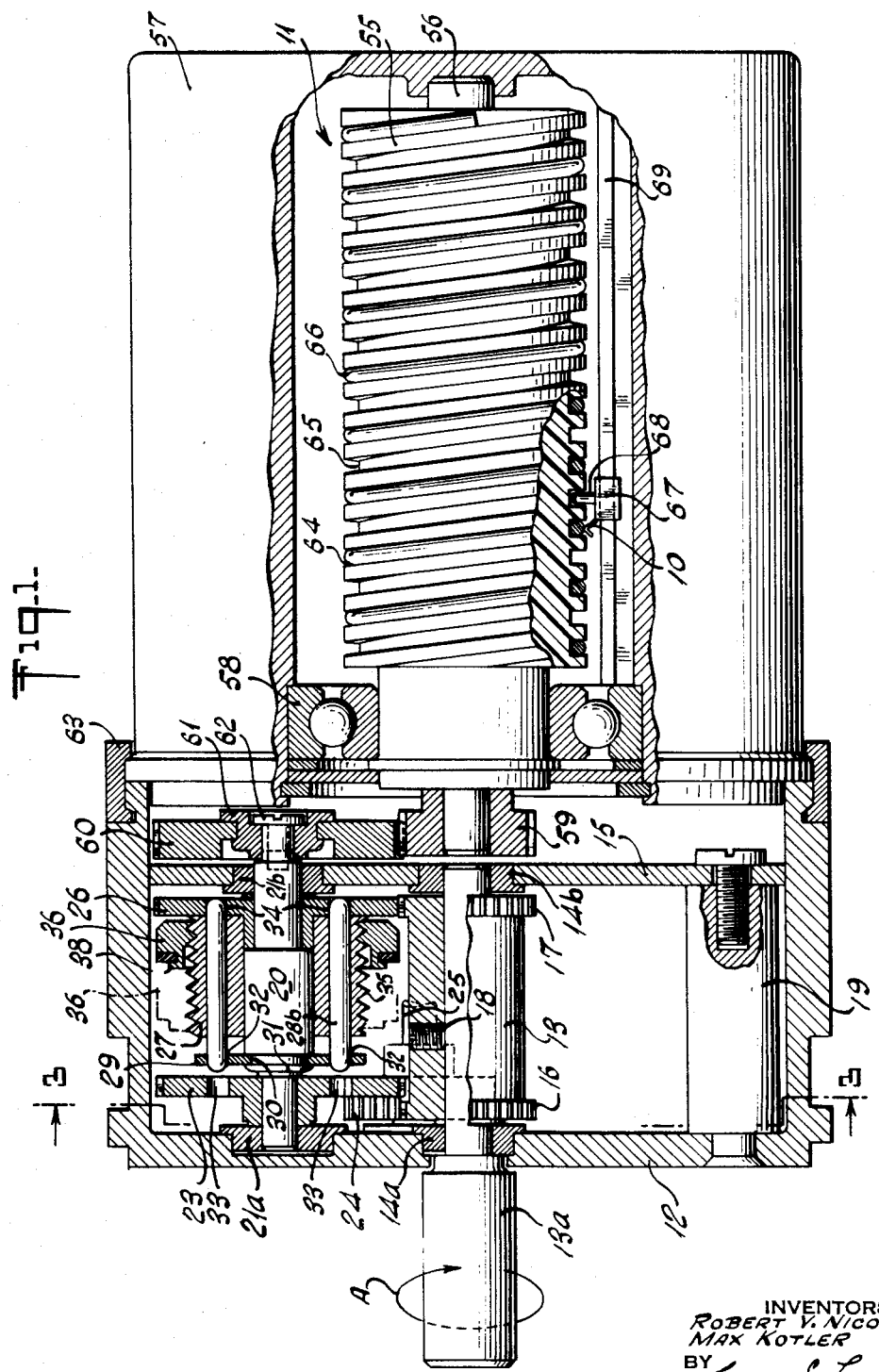

May 31, 1960 R. V. NICOLOSI ET AL 2,938,396
AUTOMATIC REVERSING MECHANISM
Filed May 26, 1959 2 Sheets-Sheet 1

INVENTORS
ROBERT V. NICOLOSI
MAX KOTLER
BY
Eugene S. Lovette
ATTORNEY

May 31, 1960 R. V. NICOLOSI ET AL 2,938,396
AUTOMATIC REVERSING MECHANISM
Filed May 26, 1959 2 Sheets-Sheet 2

INVENTORS
ROBERT V. NICOLOSI
MAX KOTLER
BY
ATTORNEY

United States Patent Office

2,938,396
Patented May 31, 1960

2,938,396
AUTOMATIC REVERSING MECHANISM

Robert V. Nicolosi, Valley Stream, and Max Kotler, Seaford, N.Y., assignors, by mesne assignments, to Fulton W. Sandler, West Orange, N.J.

Filed May 26, 1959, Ser. No. 815,858

6 Claims. (Cl. 74—322)

This invention relates to gear train means adapted for converting unidirectional rotation of drive means about an axis into alternating or bidirectional rotation of driven means about an axis, and in particular, the invention is especially suitable for imparting alternating motion to apparatus, such as a multi-turn potentiometer, for the purpose of regulating its operation between its resistive limits.

It is the principal object of the invention disclosed herein to provide gear train means capable of converting an input constituted by a unidirectional rotation into an output constituted by a bidirectional or alternating rotation and to effect such conversion automatically with precision, accuracy and reliability. The input mechanism may be constituted by a drive shaft continuously turned in a preselected single direction about its axis. The output mechanism may be constituted by a driven shaft, which in accordance with the practice of this invention will turn about its axis, first in one direction and then the other, in response to continuous turning of the drive shaft in one direction. As a further advantage of the invention, the improved gear train mechanism is adaptable for divers uses in any one of a number of different fields of application for imparting and regulating rotation of any load device requiring oscillating motion.

It is a further object of the invention to provide a reversing gear train mechanism for converting a unidirectional rotational input automatically to a bidirectional or alternating rotational output constituted by structure capable of precision operation and compactness in size, offering reliability, efficiency and economy in operation and use and also being relatively economical and simple in manufacture.

It is a further object of the invention to provide means for regulating and varying the resistance of a rheostat requiring alternating rotation of a turnable component about an axis, which means is capable of converting a continuous input of unidirectional turning into an output of alternate rotation whereby the resistance of the rheostat may be reciprocated between its two limits.

It is a further object of the invention to provide means for converting unidirectional input rotation of drive means about an axis into alternating rotation of driven means about an axis constituted by a gear train including a pair of spaced metering gears adapted for individual rotation in opposite directions in response to turning of the drive means, and including turnable metering means adapted for alternate travel from one to the other of two positions wherein the metering means temporarily keys with one of said gears when in one position and then temporarily keys with the other of said gears for the second of its positions such that the metering means turns with the gear keyed therewith. The metering means is also keyed to the driven means to impart a controlled rotation thereto. The device also includes a metering operator for regulating alternate travel of the metering means wherein the metering means is retained keyed with one gear for determining the direction of turning of the driven means in one direction and then is released for keying with the other gear for imparting reversed turning to the driven means.

Figure 2:
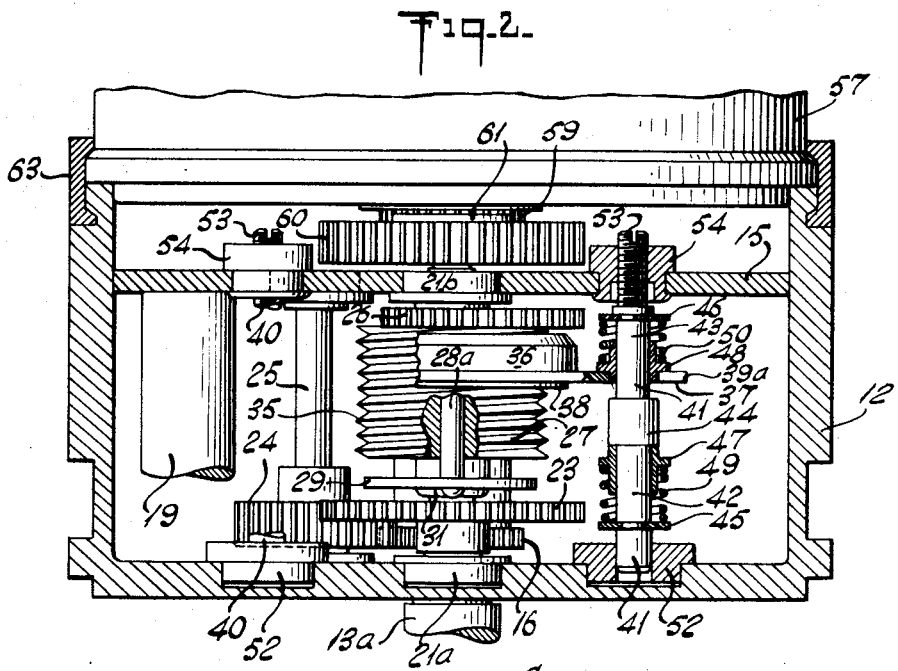
Figure 3:
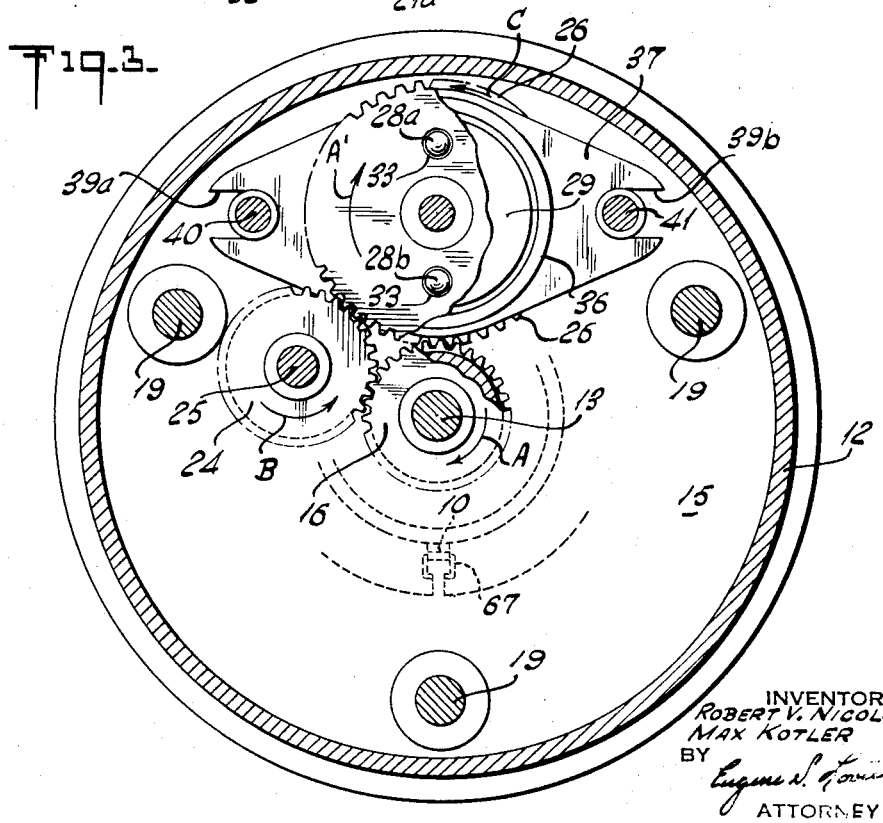

Further objects and advantages will become apparent from the following description of the invention taken in conjunction with the figures, in which:

Fig. 1 is a cutaway longitudinal plan view and in section and illustrates an automatic reversing gear train mechanism in accordance with the practice of the invention;

Fig. 2 is an enlarged fragmentary view looking down upon the gear mechanism of Fig. 1 with parts thereof cutaway to show certain of the components of the mechanism; and Fig. 3 is a plan end view of the apparatus taken along line 3—3 of Fig. 1 and shows certain of the components thereof in section and others partially cutaway to illustrate the operational relationship between many of the components constituting the mechanism.

Reference is now made to the figures for an illustration of a reversing gear mechanism in accordance with the practice of the claimed inventions. In the illustrated embodiment, the invention is adapted to control the travel of a wiper 10 of a potentiometer 11. The gear mechanism is contained in a hollow and substantially cylindrical shaped housing 12 and includes a main drive shaft 13. Shaft 13 has a front end 13a projecting from the interior of housing 12. The front end 13a of the shaft provides means for turning or otherwise manipulating shaft 13 either manually or by some control unit not shown herein. In accordance with the invention, drive shaft 13 is adapted to rotate about its axis only in one direction, either clockwise or counterclockwise, for causing potentiometer wiper 10 to travel between two limit positions. For the purpose of analyzing the invention herein, it will be assumed that drive shaft 13 at all times turns clockwise in the direction of arrow A.

Drive shaft 13 is journalled by spaced forward and rear bushings 14a, b supported, respectively, in the front wall of housing 12 and in a disc-shaped mounting plate 15. Mounting plate 15 is supported upright in a rear region of housing 12 by bolt screws 19. A pair of axially spaced driving gears 16, 17 are mounted on drive shaft 13 to turn therewith. Although gears 16, 17 may be designed as separate units individually keyed to shaft 13, in the illustrated embodiment, gears 16, 17 are integral components of a single unit, which unit is keyed to shaft 13 by a set screw 18. Hence, gears 16, 17 turn in the direction depicted by arrow A. A driven shaft 20 is supported in housing 12 adjacent and in parallel relationship in respect to shaft 13. Shaft 20 is adapted to turn in either direction about its longitudinal axis. The ends of driven shaft 20 are journalled by forward and rear bushings 21a, b supported, respectively, in the front wall of housing 12 and in mounting plate 15. A driven or metering gear 23 is mounted to rotate freely on the forward end of shaft 20. Gear 23 is continuously in toothed engagement with an idler gear 24. Idler 24 is continuously in toothed engagement with forward driving gear 16. Idler 24 is supported by a shaft 25 to turn in the direction of arrow B, Fig. 3. Shaft 25 is journalled by suitable means between the front wall of housing 12 and mounting plate 15. By reason of the foregoing arrangement, gear 23 is adapted for continuous turning in the clockwise direction of arrow A' (Fig. 3) in response to turning of driving shaft 13.

A second driven or metering gear 26 is mounted in front of mounting plate 15. Gear 26 is also adapted to rotate freely on driven shaft 20. Gear 26 is continuously in toothed engagement with and driven directly by rear driving gear 17, whereby gear 26 is adapted to turn continuously in the direction of arrow C (Fig. 3). Consequently, by means of the foregoing arrangements, metering gears 23, 26 are continuously driven by shaft 13; however, the metering gears turn in opposite directions with respect to each other regardless of the direction of turning of shaft 20.

A longitudinal metering screw 27 is mounted to slide freely along shaft 20 between gear 26 and a metering disc 29. For reasons shown herein, screw 27 is turnable about its axis and in addition, adapted for axial travel alternately between its two limit positions. A pair of diametrically opposite longitudinal metering pins 28a, b extend axially through metering screw 27. Pins 28a, b are held fast to screw 27 by suitable means, whereby screw 27 and pins 28a, b are adapted to undergo alternate axial travel along shaft 20 and turning about the axis of shaft 20 as a single unit. Pins 28a, b are longer than screw 27, whereby the left and right side ends of the pins protrude axially from the forward and rear faces of screw 27. The circular metering disc 29 is keyed or otherwise held fast to shaft 20. Disc 29 registers in an annular recess 30 in shaft 20 whereby a flange 31 of shaft 20 is peened to clamp disc 29 so that the latter turns continuously with shaft 20. Disc 29 has spaced clearance openings at 32, which openings are aligned to permit the forward ends of pins 28a, b to extend slidably therethrough. Pins 28a, b are of such length to insure engagement with disc 29 continuously even when screw 27 is at its extreme right position. By means of the foregoing arrangement, shaft 20, pins 28a, b and disc 29 are keyed to revolve about the axis of shaft 20 as a single unit.

Each of the driven gears 23, 26 has a pair of spaced openings 33, 34 suitably aligned to receive and slidably fit over the individual ends of pins 28a, b. When screw 27 and thus pins 28a, b are shifted to the left, the forward ends of the pins are adapted to fit into and engage openings 33 in gear 23. When screw 27 and thus pins 28a, b are shifted to the right, the rearward ends of pins 28a, b are adapted to fit into and engage holes 34 in gear 26. The axial length of pins 28a, b are selected so that they alternately engage one and then the other of the metering gears 23, 26 to turn therewith. In the illustrated position of metering screw 27 (Fig. 1), the right side ends of pins 28a, b are keyed to gear 26. When pins 28a, b are in this position, their left side ends do not reach into holes 33 of gear 23, although pins 28a, b are long enough to engage disc 29. Consequently, it will be understood that pins 28a, b are adapted to be rotatably keyed to either one or the other of driven gears 23, 26, but not to both gears simultaneously, whereby rotation of the particular gear temporarily keyed to the pins is imparted to shaft 20 via metering disc 29.

The outer surface of metering screw 27 is threaded at 35. A metering nut 36 is provided with an internal thread and is operatively mounted for axial travel along screw 27. Metering nut 36 is held against rotation by a spring biased system which includes a metering plate 37 provided with a central opening fitted over metering nut 36. Metering plate 37 is held fast to nut 36 by a flange 38 of nut 36, which flange is peened against plate 37. In a front plan view, Fig. 3, metering plate 37 is substantially oval in shape and has diametrically opposed transverse ends provided with inwardly turned recesses 39a, b. The spring biased system also includes a pair of spaced diametrically opposed metering posts 40, 41. Posts 40, 41 are held in fixed parallel relationship between the front wall of housing 12 and mounting plate 15. The right side post 41 is shown fully in Fig. 2, whereas the left side post 40 is broken away in the figure to permit a detail view of other parts of the mechanism. In all respects, the two posts are identical in structure and in their operational coaction with respect to metering plate 37, hence only one post is shown for the purpose of description.

The posts are provided with forward and rear surface portions 42, 43 of a first outer diameter separated by an intermediate portion 44 of slightly larger outer diameter. Forward and rear abutment washers 45, 46 are mounted in fixed positions at the end portions of each post 40, 41, for example by being held fast in correlated posts. Each post has a pair of axially spaced stop shoulders 44a, b formed by the end faces of the intermediate portion 44 of the posts. Each post is provided with forward and rear metering sleeves 47, 48. Metering sleeves 47, 48 are operatively mounted for slidable axial travel alternately along forward and rear surface portions 42, 43, respectively. Each post is also provided with forward and rear metering springs 49, 50, wherein each metering spring is individually operatively mounted to act against an individual metering sleeve. Metering springs 49, 50 are held in compression between flanges 51a, b of correlated sleeves 47, 48 and abutments 45, 46.

During operation of the reversing mechanism, nut 36 is adapted to undergo alternate shifting from one to another of two end positions along screw 27 during the interval of operation when screw 27 is keyed to a respective one of gears 23, 26. During axial shifting of nut 36, metering plate 37 is carried therewith. When nut 36 approaches its end position along screw 27, for example the rear or right end position, plate recesses 39a, b slidably advance over the forward ends of sleeves 48 whereby plate 37 is brought into pressing contact against sleeve flanges 51b to carry sleeves 48 rearwardly along post portions 43 against springs 50. The springs are designed to stop rearward movement of the assemblage shortly after sleeves 48 are engaged. This halts travel of nut 36, whereby screw 27 is suddenly shifted by instantaneous action under the force of the loaded springs 50 to the left to disengage from gear 26 and keyed in with gear 23. The foregoing shifting action reverses rotation of screw 27, whereby nut 36 will start travel along screw 27 towards its forward end position and as it does, plate recesses 39a, b will soon slide off rear sleeves 48 and slidably traverse mid-section 44 and then slidably overlap the forward pair of sleeves 47. Accordingly, plate recesses 39a, b are dimensioned to permit free sliding of plate 37 onto and off from the engaged portions of metering sleeves 47, 48 and over the intermediate post portions 44. In the illustrated embodiment, the outer diameters of sleeves 47, 48 overlapped by plate recesses 39a, b and the outer diameter of portions 44, are the same size.

Operation of the reversing mechanism will now be considered wherein, drive shaft 13 is assumed to be continuously rotated by means not shown and in the direction of arrow A to cause continuous rotation of metering gears 23, 26 in the directions of arrows A' and C, respectively, as depicted in the figures. For the position of metering screw 27, as shown in Fig. 1, it will be assumed for the moment that metering nut 36 is at its forward end position along screw 27 as depicted in dashed outline in Fig. 1. For the foregoing assumed position of nut 36, forward sleeves 47 are held by plate 37 at an intermediate position along post portions 42 against the force of springs 49. For the foregoing assumed position of the mechanism components, screw 27 is axially stationary at rest against gear 26, whereby screw 27 is turning in the proper direction to force nut 36 to travel therealong to its rear or right end position. Any available conventional means may be employed for determining maximum axial translation of screw 27 along shaft 20 during operation of the mechanism. In the enclosed embodiment, screw 27 comes to rest at its respective end positions when the correlated end faces thereof bear against the confronting faces of disc 29 and gear 26. As nut 36 commences rearward axial travel along screw 27, sleeves 47 follow plate 37 by reason of the expanding action of springs 49. The stored force provided by springs 48 also overcomes the inertia of the system to facilitate initial axial movement of nut 36 along screw 27. Continued rotation of screw 27 causes nut 36 to reach mid-section 44 wherein plate 37 slides off the engaged portions of forward sleeves 47, which sleeves come to rest against stops 44a. Plate 37 slidably advances rearwardly over mid-section 44 and then slidably overlaps rearward sleeves 48 as plate 37 picks up flanges 51b to carry sleeves 48 therewith. Sleeves 48 were at rest against stops 44b under the action of springs 50 until picked up by the moving plate 37.

As noted hereinbefore, springs 50 are designed to furnish an opposing load which soon halts the moving assemblage soon after plate 37 picks up and advances sleeves 48. By reason of such action, nut 36 can no longer advance rearwardly along screw 27. Since the illustrated structure prevents rotation of nut 36 about the axis of screw 27, continued rotation of screw 27 in the direction of arrow C causes a sudden axial shifting of screw 27 and its assemblage to the left along shaft 20 under the force of springs 50. Such action withdraws pins 28a, b from holes 34 of gear 26 and then causes the left side ends of said pins to key into holes 33 of gear 23. The foregoing shift of the assemblage is relatively instantaneous once it commences. If holes 33 of turning gear 23 are not aligned to receive the approaching pins, the pins will slide along the confronting face of gear 23 until holes 33 are aligned for the pins to key therein under the force of springs 50. It is desirable to bevel the opposite ends of the pins, as depicted in the figures, to facilitate keying of same into the gear holes.

Once screw 27 is keyed to turn with gear 23, the direction of turning is now proper to force axial travel of nut 36 to the left or its forward end position. The assemblage is designed so that at the start of such nut movement, sleeves 48 have not yet come to rest against stops 44b to relieve the assemblage of the pushing force still being furnished by springs 50. This is desirable for two reasons. It supplies sufficient spring loading to assist initial movement of nut 36 to the left to overcome inertia of the system; and secondly, it drives pins 28a, b axially deeper into gear holes 33, which pins will ultimately lock therein as screw 27 rotates with gear 23. It will be understood that a similar locking arrangement existed when the right ends of pins 28a, b were keyed with gear 26. Hence, springs 50 are characterized to apply sufficient loading force to effect the previously described shifting of screw 27 and its assemblage from a temporarily locked engagement with metering gear 26 and to assure keying of the pins into gear 23. The foregoing characteristics described to springs 50 also apply to springs 49 for similar purposes to obtain a similar disengagement with respect to gear 23 and shifting of screw 27 and its assemblage to the right at a subsequent portion of the cycle of operation.

It is thus seen that springs 49, 50 in a sense operate as thrust storage devices to impart axial travel of nut 36 along screw 27. In the preferred embodiment, the arrangement is such that axial travel of nut 36, as it alternates between its end positions, is stopped short of actual contact with the confronting surfaces of disc 29 and gear 26 by springs 49, 50 to prevent binding of the mechanism. For example, Fig. 1 shows nut 36 at its right end position spaced adjacent but not contacting gear 26.

Returning now to operation of the mechanism, screw 27 will come to rest against disc 29. With screw 27 turning in the direction of arrow A', nut 36 travels to its forward position and as it does, plate 37 slides off rear sleeves 48 as the forward ends thereof are halted by stops 44b. Plate 37 traverses post mid-portions 44 and then slidably overlaps forward sleeves 47 resting against stops 44a to pick up sleeve flanges 51a. Further forward advancement of the assemblage is soon brought to a halt by springs 49 with nut 36 axially at rest at its forward position adjacent but not contacting disc 29. Continued rotation of screw 27 in the direction of arrow A' causes the loaded springs 49 to suddenly shift screw 27 and its assemblage in instantaneous action to the right to effect disengagement from gear 23 and keying into gear 26, wherein the previous sequence of events is now repeated.

It is desirable that the foregoing described spring load means impart uniform resilient loading to the diametrically opposite sides of plate 37, whereby plate 37, and thus nut 36, is maintained relatively orthogonal to the axis of shaft 20 when engaged by the springs. This is achieved by individual axial adjustments to posts 40, 41. The front ends of the posts slidably fit into respective bushings 52 carried in the front wall of housing 12. The back ends of the posts are threaded at 53 and, accordingly, threadedly held by respective bushings 54 carried by mounting plate 15. By threadedly adjusting each post with respect to bushings 54, the individual posts may be moved forwardly or rearwardly to a fixed desired position. In addition, the foregoing arrangement will compensate for individual loading variations imparted by the springs.

It will be understood that the number of turns experienced by shaft 20 for each axial sweep of nut 36 from one to the other of its end positions along screw 27 may be decreased or increased by axially repositioning the limit stops for nut 36 for a given metering screw. This may be achieved by various means, including changing the axial location of flanges 51a, b along sleeves 47, 48. For example, if flanges 51b are located closer to the front ends of sleeves 48, nut 36 is brought to a halt further away from the rear end face of screw 27 which will decrease the number of rotations experienced by shaft 20 for turning in each of its directions.

The illustrated gear train mechanism is adaptable for use in any one of a number of different fields of application for regulating any load device requiring oscillating motion. The mechanism is particularly suitable for use wherein continuous unidirectional motion is desired for operating a device requiring alternating bidirectional motion. For example, in the disclosed embodiment the output of shaft 20 is designed to impart continuously alternating bidirectional motion to the rotatable component of potentiometer 11.

Potentiometer 11 has a turnable barrel 55, the shaft 56 of which is adapted for bidirectional turning. One end of barrel shaft 56 is journalled in a rear wall of a potentiometer casing 57 and the forward end of shaft 56 is journalled by a race 58. Turnable movement is imparted to barrel shaft 56 by a gear 59 keyed thereto, which gear 59 is in meshed engagement with an output gear 60 supported at the end of driven shaft 20 and on the rear side of mounting plate 15. Gear 60 is carried by a hub 61 held to the end of shaft 20 by a bolt screw 62. Potentiometer 11 is enclosed by casing 57 which is attached to the open rear end of housing 12 by a clamp ring 63.

Barrel has a pair of similar spiral grooves 64, 65. A resistance wire 66 is wound in groove 64. The other groove 65 serves as a guide for a wiper trolley 67, which trolley has a pin 68 slidably keyed with groove 65. Trolley 67 is mounted for slidable movement on a stationary rail 69 supported parallel to the axis of barrel 55. As rheostat barrel rotates alternately in opposite directions, correlated reciprocating movement is imparted to wiper 10 as it slidably contacts resistance wire 66, whereby the resistance of potentiometer 11 is reciprocated between its limits. In the preferred embodiment of potentiometer 11, it is desirable to synchronize the movements of nut 36 along screw 27 and wiper 10 along rail 69, such that both alternate to their respective limit positions at the same time and thus travel in unison. This may be achieved by arranging screw 27 and barrel 55 to turn in accordance with similar pitch ratios. As noted hereinbefore, the number of wiper revolutions for turning in each direction may be decreased by decreasing the separation between the metering nut limit stops. The rate of travel of wiper 10 may differ for movement in one direction with respect to the other direction by selective adjustment of gear ratios between gears 16, 23 and 17, 26. For example, gears 16, 23 may be provided with a 1:1 ratio and gears 17, 26 may be provided with a 2:1 ratio which will result in wiper 10 travelling twice as fast in one direction as the other. As a further advantage of the invention, the gear mechanism may be made extremely light in weight and compact in size and is thus especially adaptable for aircraft usage or other usage requiring compact light-weight structures. In particular, the size of the gear mechanism in comparison to potentiometer 11 may be relatively smaller in size. Furthermore, the gear mechanisms eliminates the need of limit stops as normally required for potentiometers having revolvable components for alternating its resistance between its limit values. The limit stops for potentiometer 11 are those operatively co-acting against nut 36. Moreover, durability and long-life operation of the gear mechanism may be extended appreciably by suitable hardening of moving parts thereof. In one working embodiment of the invention for the purpose of regulating potentiometer operation, the gear mechanism was driven to impart a 250 r.p.m. to driven shaft 20 and springs 49, 50 were characterized by a 3 oz. thrust. Lighter springs may be used for manual operation, whereas stronger springs are required when operating driven shaft 20 at higher speeds.

It is intended that all matter contained in the above description or shown in the accompanying drawings shall be interpreted as illustrative and not in a limiting sense.

What is claimed is:

1. A reversing mechanism for converting continuous rotation of drive means in a preselected direction about an axis into alternate rotation of second means about an axis comprising, drive means adapted for turning in a preselected direction about an axis, driven means adapted for alternate turning about an axis, a pair of turning means individually rotatable in opposite directions with respect to each other in response to turning of said drive means, turnable metering means adapted for axial travel alternately from one to another of two positions, said metering means being keyed individually to each of said turning means in response to being at one or the other of its two positions, rotation imparted to said metering means being controlled by the direction of turning of the particular one of said turning means keyed therewith, said metering means also being operatively associated with said driven means to impart rotation thereto, a metering operator adapted for alternate axial displacement from one to another of two positions along said metering means, means temporarily retaining said operator alternately at correlated ones of its positions on said metering means, said metering means being adapted to travel axially from one to the other of its positions in response to said operator being retained in an individual one of its positions to alternate rotation of said driven means, said retaining means being adapted to release said operator for displacement from one to another of its two positions by reason of correlated turning of said metering means in response to being keyed with a particular one of said turning means during that period of operation wherein said metering means is axially stationary at a correlated one of its positions, and means continuously holding said operator against rotation, said metering means having a threaded outer surface, and said operator having a threaded interior surface and being operatively mounted for travel along said threaded outer surface.

2. Apparatus as defined in claim 1 wherein, said drive and driven means being individual rotatable shafts, said turning means being freely rotatable on said driven shaft, and means coupled to said drive shaft for individually rotating said turning means in opposite directions with respect to each other.

3. A reversing mechanism for converting continuous rotation of drive means in a preselected direction about an axis into alternate rotation of second means about an axis comprising, drive means adapted for turning in a preselected direction about an axis, driven means adapted for alternate turning about an axis, a pair of turning means individually rotatable in opposite directions with respect to each other in response to turning of said drive means, turnable metering means adapted for axial travel alternately from one to another of two positions, said metering means being keyed individually to each of said turning means in response to being at one or the other of its two positions, rotation imparted to said metering means being controlled by the direction of turning of the particular one of said turning means keyed therewith, said metering means also being operatively associated with said driven means to impart rotation thereto, a metering operator adapted for alternate axial displacement from one to another of two positions along said metering means, and means temporarily retaining said operator alternately at correlated ones of its positions on said metering means, said metering means being adapted to travel axially from one to the other of its positions in response to said operator being retained in an individual one of its positions to alternate rotation of said driven means, said retaining means being adapted to release said operator for displacement from one to another of its two positions by reason of correlated turning of said metering means in response to being keyed with a particular one of said turning means during that period of operation wherein said metering means is axially stationary at a correlated one of its positions, said metering means including, axially overlapping members having opposed ends for keying into individual ones of said turning means.

4. Apparatus as defined in claim 1 wherein said operator retaining means and said continuous holding means comprising, a pair of longitudinal posts with individual ones of said posts on diametrically opposite sides of an axis, a metering plate fixed to said operator and having diametrically spaced openings overlapping individual ones of said posts for preventing turning of said operator, abutment means at the end portions of said posts, a pair of axially spaced stop shoulders at the intermediate portions of said posts, forward and rear metering sleeves for each post, individual ones of said sleeves being operatively mounted for slidable travel on either side of said stop shoulders of said posts, individual metering springs operatively associated with each metering sleeve, said springs being held in compression by correlated ones of said abutments and metering sleeves, the openings of said mounting plate being dimensioned to slide onto and off from said metering sleeves and over the intermediate portions of said posts between the stop shoulders thereof during axial travel of said operator, one spring of each post defining a forward pair and being loaded in compression by reason of said mounting plate slidably overlapping and engaging the forward ones of said sleeves and thus carrying same against said springs until the moving assemblage is stopped by the loaded springs, one spring of each post defining a rearward pair and being loaded in compression by reason of said mounting plate slidably overlapping and engaging the rearward ones of said sleeves and thus carrying same against said springs until the moving assemblage is stopped by the loaded springs, initial axial displacement of said operator from one to the other of its positions being aided by the loaded pair of correlated springs while the axially stationary metering screw is turning in a direction to effect travel of said operator therealong and continued displacement of said operator along said metering means releases the loaded springs whereby the operatively associated metering sleeves are stopped by correlated ones of said stop shoulders to allow said metering plate to slide off such sleeves and traverse the intermediate post portions and then slidably overlap the other pair of metering sleeves to load the springs operatively associated therewith until halted by the loaded springs, continued turning of said metering means now results in axial shifting of same in a direction from which said operator originated to cause said metering means to disengage from a correlated one of said turning means and key into the other one of said turning means whereby rotation of said metering means is reversed which results in return travel of said operator.

5. A reversing mechanism for converting continuous rotation of drive means in a preselected direction about an axis into alternate rotation of second means about an axis comprising, drive means adapted for turning in a preselected direction about an axis, driven means adapted for alternate turning about an axis, a pair of turning means individually rotatable in opposite directions with respect to each other in response to turning of said drive means, turnable metering means adapted for axial travel alternately from one to another of two positions, said metering means being keyed individually to each of said turning means in response to being at one or the other of its two positions, rotation imparted to said metering means being controlled by the direction of turning of the particular one of said turning means keyed therewith, said metering means also being operatively associated with said driven means to impart rotation thereto, a metering operator adapted for alternate axial displacement from one to another of two positions along said metering means, and means temporarily retaining said operator alternately at correlated ones of its positions on said metering means, said metering means being adapted to travel axially from one to the other of its positions in response to said operator being retained in an individual one of its positions to alternate rotation of said driven means, said retaining means being adapted to release said operator for displacement from one to another of its two positions by reason of correlated turning of said metering means in respnse to being keyed with a particular one of said turning means during that period of operation wherein said metering means is axially stationary at a correlated one of its positions, said operator retaining means comprising, longitudinal posts on diametrically opposite sides of said metering means and coextending therewith, said operator having diametrically spaced means slidably overlapping said post means for preventing turning of said operator about the axis of said metering means, axially spaced stop means defining intermediate post portions, forward and rear resilient means operatively associated with each post, the forward resilient means of each post forming a pair being loaded in compression by reason of said operator engaging same as said operator approaches a correlated one of its positions until the moving operator is stopped by the loaded resilient means, the rear resilient means of each post forming a pair being loaded in compression by reason of said operator engaging same as said operator approaches its other position until the moving operator is stopped by the loaded resilient means, displacement of said operator along said metering means away from a correlated one of its positions releases the correlated pair of loaded resilient means, wherein said operator traverses the intermediate post portions and then advances to engage the other pair of resilient means to cause loaded compression thereof until halted, whereby the turning metering means is axially shifted in the direction from which said operator originated to cause said metering means to disengage a correlated one of said turning means and engage the other turning means, whereby rotation of said metering means is reversed to effect return displacement of said operator.

6. A reversing mechanism for converting continuous rotation of a drive shaft in a preselected single direction about its axis into driven rotation of a second shaft alternately in opposite directions about its axis comprising, a drive shaft adapted for turning in a preselected direction about its axis, first and second axially spaced drive gears keyed to said shaft to turn therewith, a driven shaft adapted for turning in either direction about its axis, first and second axially spaced metering gears freely rotatable on said driven shaft, an idler gear continuously in toothed engagement with said first drive gear, said idler gear also being continuously in toothed engagement with said first metering gear, said second drive gear being continuously in toothed engagement with said second metering gear, wherein rotation of said drive shaft results in continuous rotation of said metering gears individually in opposite directions about the axis of said driven shaft, a metering screw adapted for slidable axial displacement along said driven shaft alternately from one to another of two axially spaced limit positions between said metering gears, means keyed to said screw to shift axially therewith and also to rotate therewith, said keyed means axially overlapping the ends of said metering screw to engage each of said metering gears individually depending whether said screw is in one or the other of its two limit positions, said screw being rotatably about its own axis in the same direction as the engaged one of said metering gears, disc means keyed to said driven shaft to rotate therewith, said keyed means slidably extending through said disc means to impart rotation to said driven shaft about its axis in the same direction as imparted to said screw, said screw having a threaded outer surface, a metering nut having an interior thread and being operatively mounted on said threaded outer surface, said nut being adapted for axial displacement alternately from one to another of two axially spaced limit positions along said screw, means continuously holding said nut against rotation, said screw being adapted to undergo axial displacement along said driven shaft in alternate directions from one to the other of its limit positions in response to said nut being restrained in a respective one of its limit positions, means temporarily restraining said nut against axial travel during axial travel of said screw from one to the other of its limit positions, said restraining means being adapted to release said nut for axial travel from one to the other of its limit positions by reason of a correlated rotation of said screw in response to said keyed means engaging a correlated one of said metering gears during that time said screw is held against axial displacement, and said screw being released for axial displacement along said driven shaft in response to said nut being retained in fixed relationship at a correlated one of its limit positions, whereby said keyed means is released from engagement with one metering gear and enters into engagement with the other metering gear wherein rotation of said driven shaft is reversed.

References Cited in the file of this patent

UNITED STATES PATENTS

| | | |
|---|---|---|
| 1,146,228 | Zint | July 13, 1915 |
| 2,801,806 | Taylor | Aug. 6, 1957 |

FOREIGN PATENTS

| | | |
|---|---|---|
| 66,725 | Sweden | May 18, 1927 |